UNITED STATES PATENT OFFICE.

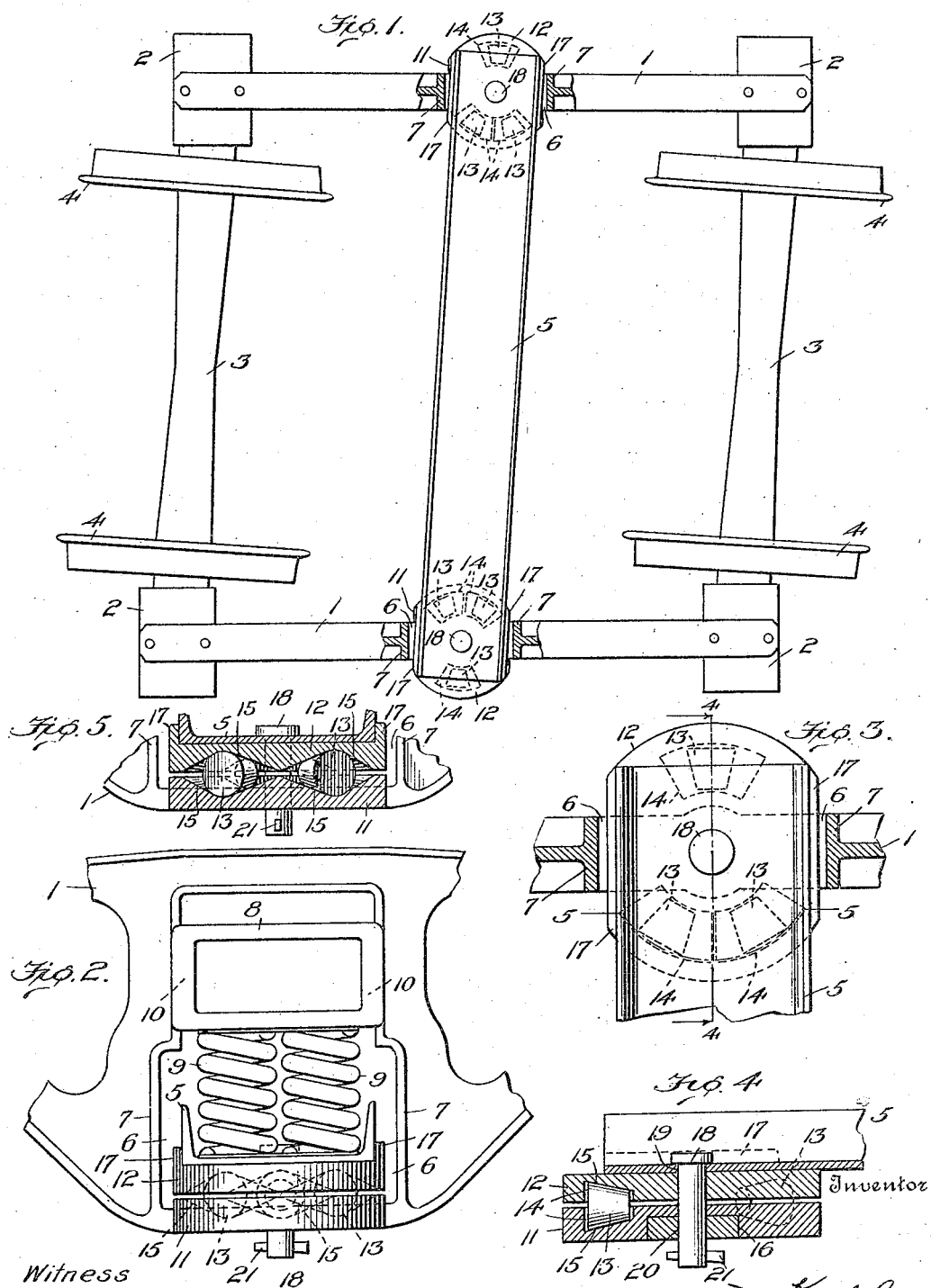

BYERS W. KADEL, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,962.   Specification of Letters Patent.   Patented May 2, 1922.

Application filed January 22, 1921, Serial No. 439,097. Renewed March 17, 1922. Serial No. 544,684.

*To all whom it may concern:*

Be it known that I, BYERS W. KADEL, a citizen of the United States, residing at Baltimore, in the State of Maryland, have invented certain new and useful Improvements in Car Trucks; and I do hereby declare the following to be a full, clear, and exact description of the invention, such as will enable others skilled in the art to which it appertains to make and use the same.

The invention relates to car trucks, and more particularly to trucks of the flexible type, which involve spaced side frame members normally maintained in square relation by gravity acting means which resists relative longitudinal displacement of either side frame member and is adapted to return the parts to normal position after a displacement thereof due to the truck passing around curves or over bad rail joints or defective switch points.

The principal object of my invention, broadly stated, is to afford simple, strong, efficient and reliable means for maintaining the side frames in normal or square relation and for resisting relative longitudinal movement of either side frame from normal position. To this end the principal feature of the invention by which this object is accomplished consists in interposing between two relatively movable parts of the car truck means whereby a longitudinal displacement of either side frame from normal position causes a vertical separation of the said parts, said vertical separation being resisted by the weight imposed by the car body on the car truck. The means for resisting relative longitudinal displacement of the side frames from normal not only performs that function but also serves to restore the parts to their square relation.

There are other features of the invention residing in the various elements and combinations of elements as hereinafter will appear.

In the drawings which illustrate the preferred embodiment of the invention, the scope whereof is pointed out in the appended claims,—

Figure 1 is a view, partly in plan and partly in horizontal section, of a car truck embodying the invention, the truck bolster, which may be of the type commonly employed in trucks of this character, being omitted and the truck parts being illustrated in a position such as they assume when the truck passes around a curve.

Figure 2 is a fragmentary side elevation of the central portion of a car truck showing the relation of the truck squaring mechanism to the side frame and cross connecting member of the truck.

Figure 3 is a plan view, partly in horizontal section, of the construction shown in Fig. 2, the bolster springs being omitted.

Figure 4 is a section on the line 4—4 of Fig. 3.

Figure 5 is a detail sectional view on the curved section line 5—5 of Fig. 3.

In the drawings, 1 indicates spaced side frame members which are capable of relative movement longitudinally of the truck. Each of the side frames is furnished at its opposite ends with journal boxes 2 receiving the journal ends of axle 3 upon which the truck wheels 4 are mounted.

The side frame members 1 are movably connected by a cross connecting means 5 which may advantageously be a spring plank member whose opposite ends extend into the bolster openings 6 of the respective side frames between the columns 7 of the latter. The spring plank 5 is sufficiently spaced from the truck columns 7 to allow it to turn freely without binding upon the said columns when the side frames 1 execute an extended displacement longitudinally of the truck from normal position. The bolster 8 which bears upon springs 9 resting upon the spring plank is likewise spaced from the columns 7 of the side frames a suitable distance, as indicated at 10, to allow the bolster freely to change its angular position in accordance with longitudinal displacements of the frame members 1.

The gravity actuated means tending to maintain the side frame members in normal relation and operating to restore them to normal after they have been shifted out of square, preferably comprise vertically separable bearing members 11 and 12, respectively, between which roller devices 13 are interposed. Each of the bearing members 11 and 12 is provided with a plurality of recesses 14, the said recesses being arranged in circularly curved relation and each being formed with oppositely inclined bearing faces 15 with which the respective rollers 13 are adapted to engage. Instead of employing balls or cylindrical rollers it is, as shown, preferred to employ roller devices 13 formed as truncated cones. The bearing members 11 and 12 and the interposed rollers 13 operating upon the inclined faces 15 of the former constitute a cam mechanism by which relative rotation of the bearing members 11 and 12 effects a vertical movement of the upper member 12 with respect to the lower member 11.

The lower bearing member 11 of each cam mechanism is rigidly mounted upon a corresponding one of the side frame members. For this purpose it may be provided on its under side with a centrally extending recess 16 which is adapted to receive the portion of the cooperating side frame 1 which extends between the columns 7 at the lower end of the latter. The upper bearing member 12 of the cam mechanism is made rigid with the spring plank 5, its connection with the latter preferably being effected by providing it with lugs 17 which closely embrace the neighboring end portion of the spring plank. The spring plank 5 may be movably connected at its opposite ends to the respective side frames 1 by means of pivot pins 18 which project through corresponding pivot openings 19 and 20 in the side frames and spring plank, respectively, and which pass through suitable apertures at the centers of the bearing members 11 and 12.

When the side frame members 1 are displaced longitudinally of the truck from normal relation as occurs, for example, when the truck passes around a curve, the spring plank or means connecting the side frames across the truck changes its angular relation with repect to the side frames. This angular movement of the spring plank 5 causes the upper bearing members 12 of the cam devices to rotate with respect to the corresponding bearing members 11 mounted upon the side frames, and through the cooperation of the rollers 13 with the inclined faces 15 the bearing members 11 and 12 of the cam devices are caused to separate. The upward vertical movement of the upper bearing members 12 thereby raises the spring plank 5. The elevation of the spring plank 5 is, of course, opposed by the load of the car which is transmitted thereto from the truck bolster 8 through the springs 9. When the external force causing the out of square displacement of the side frames 1 ceases to act the load of the car body forces the upper bearing members 12 of the cam devices downwardly toward their companion bearing members and, because of the cooperation of the rollers 13 and the inclines 15, the bearing members 11 and 12 are caused to rotate with respect to each other toward normal position, thus enforcing corresponding relative movements of the side frames 1 and the spring plank 5 to thereby restore the parts to normal position.

As is shown in the drawings, it is preferred to employ a plurality of gravity actuated means for opposing displacement of the truck parts from normal relation, but it will be apparent that a single gravity actuated means may be employed to effect that result, since the restoration of the spring plank 5 to normal relation with either of the frame members 1 necessarily results in bringing the side frames in square relation.

My invention has the advantage of rendering the resistance to longitudinal displacement of the truck frames from normal position, as well as the force promoting restoration of the parts to square relation, proportional to the weight of the car and its lading. Thus, the greater the weight of the car and its lading the greater is the opposition offered to the truck getting out of square and the greater is the force applied for returning the truck parts to normal position. As will be understood, the pressure of the wheels upon the rails varies with the load upon the truck and consequently the external forces applied to the side frames 1 and tending to throw them out of square when the truck is passing around a curve, are proportionately increased. By employing the weight of the car as the force for resisting the displacement of the side frames 1 from normal or square relation, I provide in effect a self-compensating means for controlling the movements of the side frames.

I claim:—

1. In a car truck, the combination with side frame members which are relatively movable longitudinally of the truck, of means for movably connecting said side frame members, and means whereby the load upon said truck operates to restore said side frame members to normal position after they have been displaced from such position by a relative movement longitudinally of the truck.

2. In a car truck, the combination with side frame members which are relatively movable longitudinally of the truck, of means for movably connecting said side frame members, and gravity actuated means constantly tending to maintain said side frame members in normal relation.

3. In a car truck, the combination with side frame members which are relatively movable longitudinally of the truck, of means for movably connecting said side frame members, and gravity actuated means opposing relative longitudinal displacement of said side frame members from square position and promoting relative longitudinal displacement of said side frame members toward square position.

4. In a car truck, the combination with side frame members which are relatively movable longitudinally of the truck, of means for movably connecting said side frame members, and gravity actuated means for opposing relative longitudinal displacement of said side frame members away from normal.

5. In a car truck, the combination with side frame members which are relatively movable longitudinally of the truck, of means for movably connecting said side frame members, and gravity actuated means for controlling relative longitudinal movement of said side frame members.

6. In a car truck, the combination with side frame members which are relatively movable longitudinally of the truck, of means for movably connecting said side frame members, and gravity actuated means adapted to apply force to at least one of said side frame members tending to move said frame member toward normal position after a longitudinal displacement thereof away from normal.

7. In a car truck, the combination with side frame members which are relatively movable longitudinally of the truck, of means whereby upon a relative longitudinal displacement of said side frame members from normal position the load on said truck tends to cause relative longitudinal displacement of said side frame members in the opposite direction.

8. In a car truck, the combination with side frame members which are relatively movable longitudinally of the truck, of gravity actuated means for controlling relative longitudinal displacement of said side frame members.

9. In a car truck, the combination with side frame members which are relatively movable longitudinally of the truck, of means for movably connecting said side frame members, and means interposed between at least one of said frame members and said connecting means adapted to move said connecting means upwardly upon the relative longitudinal displacement of said side frame members away from normal.

10. In a car truck, the combination with side frame members which are relatively movable longitudinally of the truck, of a spring plank connecting said frame members and pivotally movable with respect to each, and means operable upon relative longitudinal displacement of said side frame members away from normal position for raising said spring plank.

11. In a car truck, the combination with side frame members which are relatively movable longitudinally of the truck, of means for opposing relative longitudinal displacement of said side frame members away from normal position, said means being adapted to cause relative movement of said side frame members toward normal position and including roller devices and means affording inclined bearings for said roller devices.

12. In a car truck, the combination with side frame members which are relatively movable longitudinally of the truck, of a spring plank pivotally connecting said side frame members, and cam mechanism operatively interposed between said spring plank and at least one of said side frame members adapted to cause relative vertical movement of said spring plank and side frame upon a pivotal movement of said spring plank with respect to said side frame.

13. In a car truck, the combination with side frame members which are relatively movable longitudinally of the truck, of a spring plank movably connecting said side frame members, and cam means interposed between said spring plank and at least one of said side frame members, said cam means including a plurality of cone rollers and curved inclined bearings for said rollers.

14. In a car truck, the combination with side frame members which are relatively movable longitudinally of the truck, of means for movably connecting said frame members, and means operable upon a relative longitudinal displacement of said side frame members away from normal position for exerting force upon at least one of said frame members away from normal position members toward normal position, said last named means including a vertically extending spring.

15. In a car truck, the combination with side frame members which are relatively movable longitudinally of the truck, of means for resisting relative longitudinal displacement of said side frame members away from normal position, said means including a member which is adapted to be moved upwardly by said displacement of said side frame members and means for resisting upward movement of said last named member.

16. In a car truck, the combination with side frame members which are relatively movable longitudinally of the truck, of means for resisting relative longitudinal displacement of said side frame members away from normal position, said means including a member which is movable vertically upon said displacement of said side frame members and vertically compressible spring means acting upon said vertically movable member.

17. In a car truck, the combination with side frame members which are relatively movable longitudinally of the truck, of a spring plank pivotally connected at its opposite ends to said frame members, and cam devices interposed between said spring plank and each of said frame members adapted to convert a longitudinal displacement of either side frame member from normal position into a vertical movement of said spring plank, and means for resisting the vertical movement of said spring plank.

18. In a car truck, the combination with side frame members which are relatively movable longitudinally of the truck, of means connecting said side frame members, and means for resisting a longitudinal displacement of either side frame member from normal position, said last named means including cam devices adapted to be actuated by said movement of either frame member from normal position.

In testimony whereof I affix my signature.

BYERS W. KADEL.